Patented Mar. 7, 1933

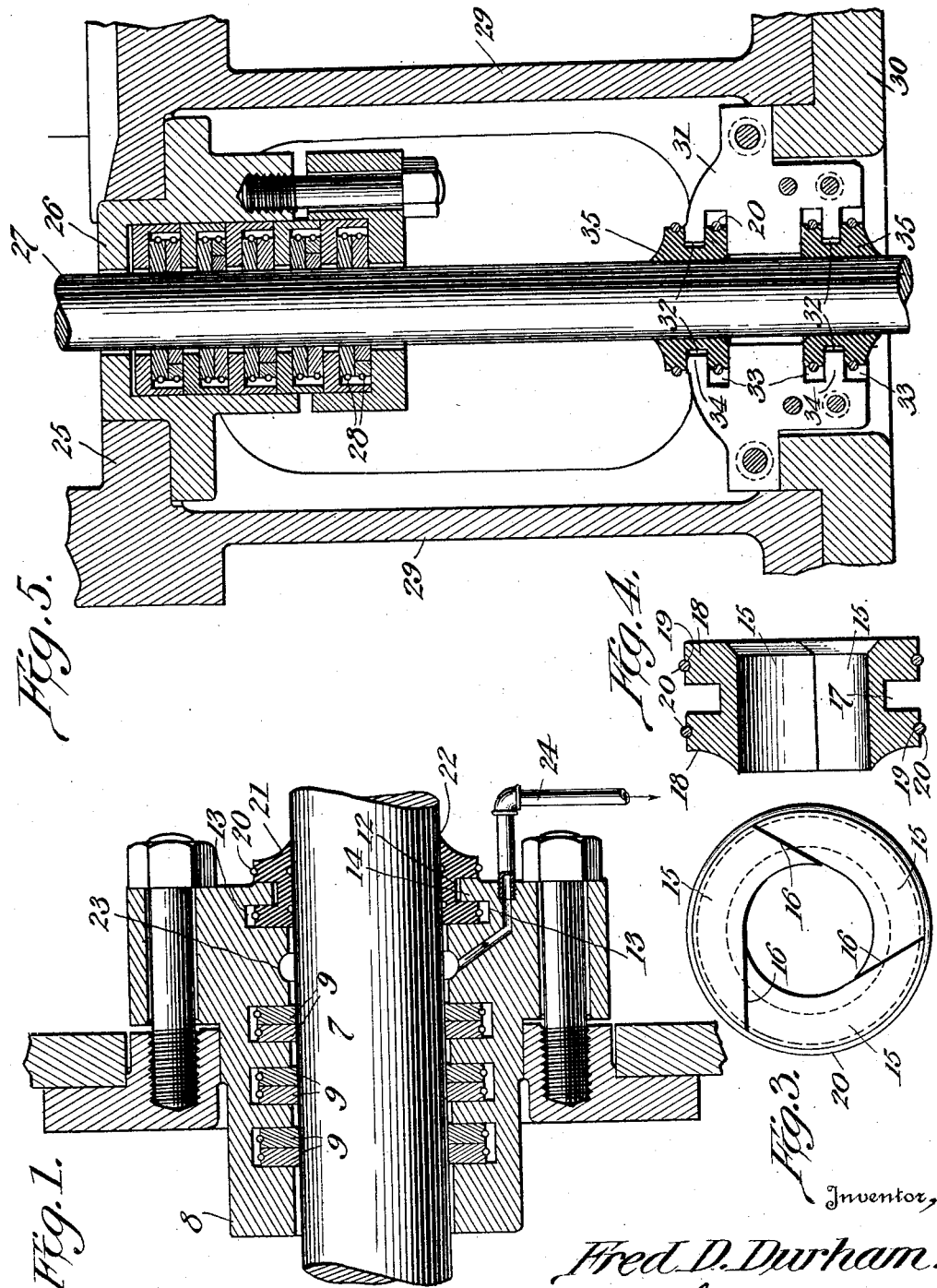

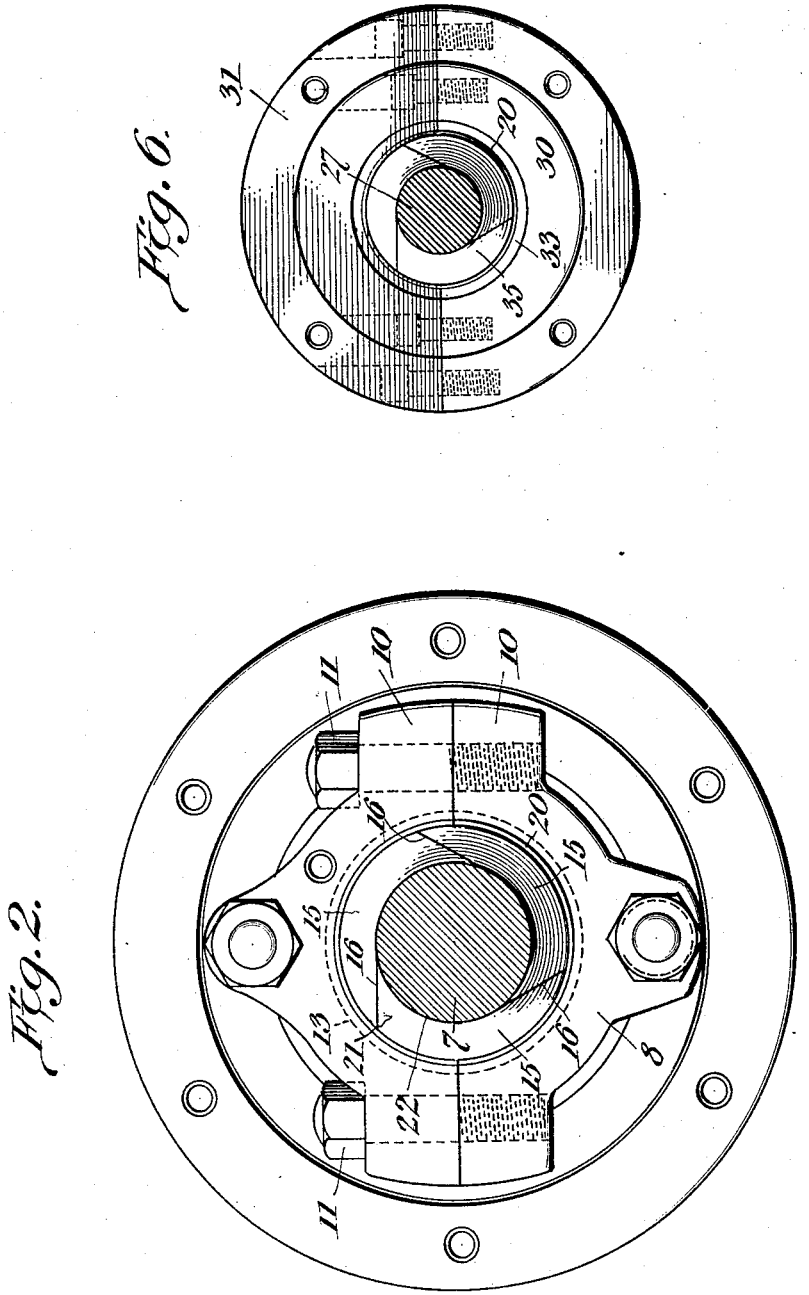

1,900,437

UNITED STATES PATENT OFFICE

FRED D. DURHAM, OF LOUISVILLE, KENTUCKY, ASSIGNOR TO C. LEE COOK MANUFACTURING COMPANY, OF LOUISVILLE, KENTUCKY, A CORPORATION OF KENTUCKY

ROD WIPING MECHANISM

Application filed March 31, 1930. Serial No. 440,604.

The primary object of the present invention is to provide a novel wiper mechanism for rods, such as piston rods, involving cooperating members so constructed and related that lubricating oil or other material carried by the rod will be removed therefrom and in which the wiping portion is external of the usual packing gland or member and of the mounting, thereby preventing oil from entering the packing and eliminating clogging drains and carbonization of the oil in the packing.

In the accompanying drawings:

Figure 1 is a longitudinal sectional view through one embodiment of the invention, in which the wiper member is carried by the packing gland.

Figure 2 is an end elevation of the same.

Figure 3 is a front elevation of the wiper ring.

Figure 4 is a longitudinal sectional view therethrough.

Figure 5 is a longitudinal sectional view of a rod packing and wiper mechanism, in which the wiper means is mounted separately of the packing gland.

Figure 6 is a front elevation of the wiper mechanism.

Referring to the embodiment illustrated in Figure 1, a portion of a reciprocatory rod is shown at 7, and is connected to a suitable piston or other operating member and to a mechanism to be moved, as for example, a pump piston. The rod 7 passes through a gland 8 in which are located suitable contractile packing rings 9 that surround the rod 7 and pack the same in a manner well understood. The form of packing is relatively immaterial and may be embodied in any well known form. The gland 8, as particularly shown in Figure 2, is formed of separable sections 10 bolted together as illustrated at 11 to form a sectional sleeve.

In one end of said sleeve is a chambered portion 12 having at its inner portion an internal annular groove 13 forming in advance of the same an internal flange or rib 14. In this chamber 12 is located a wiper ring. The ring, as shown particularly in Figures 3 and 4 is made up of separable sections 15 having tangential joints 16 so that the ring can be contracted on the rod 7 which it surrounds. The ring is provided with an annular groove 17 in its periphery, forming on opposite sides a pair of annular ribs 18. These ribs have grooves 19 in their peripheries to receive garter springs 20. One end of the ring is beveled as shown at 21, producing a wiping edge 22 at the end of its bore. The ring is located in the chamber 12 with the rib 14 in the groove 17 and with the rear rib 18 of the ring in the groove 13 of the chamber 12. The beveled end extends beyond the gland and is therefore exposed. It will be noted by reference to Figure 1 that the flanges 18 and 14 have their free edges spaced from the bottoms of the channels in which they engage. Consequently the ring is free to move laterally or "float" and yet is interlocked in the packing gland member so that it cannot move longitudinally.

Preferably between the wiper ring and the packing rings 9 is a chamber or groove 23 having a suitable drain outlet 24. With this construction, it will be evident that the wiper edge 22 is external of the packing gland and exposed so that the material wiped from the rod will not clog within the gland, but will be removed from the rod at a point wholly outside of the gland.

In Figures 5 and 6 a slightly modified form of construction is shown. In this case the cylinder head 25 is provided with a packing gland 26 in which the piston rod 27 reciprocates, this packing gland having suitable packing rings 28.

An extension from the cylinder head 25 in the form of spaced side brackets 29 carries a supplemental head 30 in which is a sectional gland member 31 that surrounds the piston rod 27. This gland member 31 is provided in its opposite ends with chambers 32 and said chambers have annular internal grooves 33 forming inwardly extending flanges 34. Oppositely disposed wiper rings 35 of the character already described and shown in Figures 3 and 4 are located in these chambers 32 and are interfitted with the ribs thereof. With this structure it will be noted that the rod is wiped on its movement in each direction and that the wiper rings have their wiping edges wholly exposed and entirely outside the packing gland.

From the foregoing, it is thought that the construction, operation and many advantages of the herein described invention will be apparent to those skilled in the art, without further description, and it will be understood that various changes in the size, shape, proportion and minor details of construction may be resorted to without departing from the spirit or sacrificing any of the advantages of the invention.

What I claim, is:

1. In combination with a rod to be wiped, a gland member surrounding the rod and having a socket in one end provided with an internal annular flange, a wiping ring having one end engaged in the socket and provided with an annular groove that receives the flange, said ring extending from the socket and having an exposed tapered end forming a wiping edge that operates on the surface of the rod.

2. In combination with a holding member having an end wall, a rod to be wiped extending through the member, a wiping ring surrounding the member, means within the member interengaging with the ring to hold it in place therein, said ring having a length sufficient to cause its outer end to be projected beyond the end of the member in which it is held, and said projecting outer end being provided with a wiping edge that acts on the portion of the rod externally of the holding member.

3. In combination with a gland member and a rod slidably passing therethrough, and a wiping ring surrounding the rod and having its inner end interlocked with the internal portion of the gland member, said ring projecting from one end of the gland member and having on its projecting end a wiping edge that acts on the rod externally of the gland member.

In testimony whereof, I affix my signature.

FRED D. DURHAM.